US008759727B2

(12) United States Patent
Gard et al.

(10) Patent No.: US 8,759,727 B2
(45) Date of Patent: Jun. 24, 2014

(54) MICROWAVE OVEN FOR ROASTING LOW MOISTURE FOODS

(75) Inventors: Robert G. Gard, San Carlos, CA (US); Glen T. Poss, Nine Mile Falls, WA (US); Robert Barker, Palo Alto, CA (US)

(73) Assignee: Coffee Technologies, International, Inc., San Carlos, CA (US)

( * ) Notice: Subject to any disclaimer, the term of this patent is extended or adjusted under 35 U.S.C. 154(b) by 169 days.

(21) Appl. No.: 13/189,502

(22) Filed: Jul. 23, 2011

(65) Prior Publication Data

US 2012/0034350 A1 Feb. 9, 2012

Related U.S. Application Data

(60) Provisional application No. 61/372,015, filed on Aug. 9, 2010.

(51) Int. Cl.

| | |
|---|---|
| ***H05B 6/78*** | (2006.01) |
| ***H05B 6/80*** | (2006.01) |
| ***A23B 4/00*** | (2006.01) |
| ***A23L 3/01*** | (2006.01) |

(52) U.S. Cl.

USPC ............ 219/678; 219/689; 426/109; 426/242

(58) Field of Classification Search

USPC ......... 219/678, 730, 689, 725, 751, 754, 762, 219/732, 734, 680, 757, 703, 715; 426/35, 426/466, 109, 234, 241, 107; 220/258.3, 220/912; 229/125.015

See application file for complete search history.

(56) References Cited

U.S. PATENT DOCUMENTS

| | | | | |
|---|---|---|---|---|
| 4,326,114 | A | 4/1982 | Gerling et al. | |
| 5,440,105 | A * | 8/1995 | Kim | 219/754 |
| 6,297,485 | B1 * | 10/2001 | Kim et al. | 219/680 |
| 6,436,457 | B1 | 8/2002 | Poss | |
| 7,348,527 | B2 * | 3/2008 | Braunisch et al. | 219/757 |
| 8,124,920 | B1 * | 2/2012 | Weber | 219/754 |
| 2002/0153370 | A1 * | 10/2002 | Stutman | 219/715 |
| 2005/0238767 | A1 * | 10/2005 | Poss | 426/109 |
| 2007/0267409 | A1 | 11/2007 | Gard et al. | |
| 2009/0236334 | A1 * | 9/2009 | Ben-Shmuel et al. | 219/703 |

* cited by examiner

*Primary Examiner* — Quang Van

(74) *Attorney, Agent, or Firm* — File-EE-Patents.com; Jay A. Chesavage

(57) ABSTRACT

A roasting oven includes an enclosure coupled to a source of microwave RF energy, an operable door for sealing the enclosure for RF, the operable door having a viewing aperture which prevents the escape of RF from inside the chamber. A rotating support has an axis which is perpendicular to the viewing aperture such that the progress of roasting may be viewed through the viewing aperture and into a food container placed in the rotating support. The applied power of the microwave RF source and the rotational velocity of the rotating support are selected to provide uniform or wide spectrum roasting of the food item. A roasting profile may include a roasting interval during which the microwave RF source and rotating support are both energized, and subsequently a cool-down interval where the microwave RF source is disabled and the rotating support continues to rotate.

15 Claims, 4 Drawing Sheets

Roasting Oven

Roast Profile

| | 502 | 504 |
|---|---|---|
| Profile Name | Italian Roast | Sunflower seeds |
| Roast Profile | Full | Full |
| Roast Power | 100% | 80% |
| Roast rotation | 65 rpm | 27 rpm |
| Roast duration | 9 min 20 sec | 5 min 13 sec |
| Cooldown interval | 2 min 20 sec | 1 min 15 sec |
| Cooldown rotation | 45 rpm | 70 rpm |

MICROWAVE OVEN FOR ROASTING LOW MOISTURE FOODS

The present application claims priority of provisional patent application Ser. No. 61/372,015 filed on Aug. 9, 2010.

FIELD OF THE INVENTION

The present subject matter relates to microwave ovens and, more particularly, to a microwave oven capable of batch roasting low-moisture units of foods, which in the present disclosure are considered to be food items with less than 20% water content, such as coffee beans.

BACKGROUND OF THE INVENTION

Roasting is a process whereby a food item such as a seed or nut is dry heated to a temperature which browns or caramelizes the food item for the purpose of enhancing the flavor, where the browning process includes the Maillard reaction and/or carbohydrate conversion. For the case of coffee beans, roasting is accomplished using one of several methods of heat transfer: convection, baking, and conduction, which are commonly used, or steaming of the bean, which is less frequently employed. The typical coffee bean roasting cycle involves the elevation of the beans to a temperature from 375° F. to 480° F., and lasting from 90 seconds to 30 minutes.

Convection heating as used in a fluid bed roaster, also known as a hot air roaster, is typically deployed in the form of a heated air stream which heats the beans and "floats" them in the heated air stream to impart a uniform roast and to reduce burning, with the unfortunate attendant stripping away through evaporative loss of a large amount of the coffee oils that are vital components in the flavor of superior coffee.

The conduction roasting method relies on heat from an a hot air source which heats a rotating metal drum, which in turn heats the tumbling beans through direct contact with the drum. The naturally circulating hot air, which is not mechanically convected, also heats the tumbling beans. The conduction method rotates the drum for agitation of the beans to prevent continuous contact from scorching the coffee beans. The conduction system uses air naturally circulating throughout the drum to remove heat and smoke and also results in loss of lighter coffee oils (and their flavor), as does the convection system where forced air circulation is used. The conduction system also prevents the controlled and easy transfer of the heat to penetrate the husk (which is also known as silverskin) and causes the internal mass of the beans to quickly rise to a desired temperature. This causes moisture, gases, and oil within the beans to vaporize and expand, thereby applying pressure to the beans, resulting in the popping of the cell structure of the beans, which is also known as "cracking". The volume of the bean expands by up to approximately 50%, which frees the silverskin from the bean. As the roasting process continues, and at progressively higher temperatures, reactions involving the amino acids and reducing sugars create brown pigment typical of the Maillard reaction. Sugars caramelize and carbohydrates react, adding to the browning effect. A very lightly roasted coffee bean loses approximately 12% of its weight from an initial green bean weight, whereas a heavily (very darkly) roasted coffee bean loses up to 28% of its weight.

Steam roasting of the beans with superheated steam is another method, although it tends to produce a sour flavor, and is accordingly used less frequently. The steam roasting process uses a high-pressure vessel and the high steam temperatures and high pressures make this system potentially dangerous for the home and commercial user. Additionally, the steam system alone cannot provide the dark and very dark roasts that are desired by most of the coffee drinking public. One example of prior art steam roasting system is described in U.S. Pat. No. 5,681,607.

Convection and conduction roasting systems cause the release of steam from the green coffee bean (which typically contains 10-12% water by weight), and the steam contains latent heat, which is released upon contact with an adjacent bean. Latent heat from steam produced by convection or conduction roasting is a contributor to making the coffee have a more desirable mellow flavor than the steam-only process, but because it is an internal release of steam from the bean, it is not a hazard presented to the user of the roasting equipment.

Other problems with conductive, convection and steam roasting include roasting the bean at too low of a temperature which causes baking with a slow release of moisture from the bean, and this slow release of pressure doesn't generate enough internal pressure to crack the bean vigorously to sufficiently increase the volume of the bean for enhanced flavor. When this occurs, the roasted bean will be of smaller size than if proper roasting occurs and the improperly cracked bean will have a green grassy flavor or a baked flavor. On the other hand, if a bean is roasted at too high of a temperature, the outer surfaces of the bean will be burned, i.e., overly caramelized and carbonized, and the inner regions of the bean will be considerably less roasted, which may contribute to unwanted flavors. In some cases, high temperature roasting will result in a burning of the silverskin.

The silverskin protects the green bean in storage by helping to prevent oxidation reactions and increased moisture loss. If the roasting profile provides a slow increase in temperature and the bean does not crack properly, parts of the silverskin may remain on the bean.

The second stage of roasting occurs once the bean cracks. Here, the additional heating of the bean results in chemical changes to the roasted bean which affects the taste of the bean to particular consumers. In many instances, continued roasting of the bean after the first crack causes a further expansion of the bean and ultimately produces a second crack.

All of the above coffee roasting processes share the inability to achieve mixed degrees of roasts in a particular batch, as the convection, conduction, and steam roasting methods previously described cannot be easily stopped and restarted to produce mixed roasts without introducing new problems, such as burning of beans which stop and come to rest on the hot surfaces when the roast is paused.

Other common problems with current coffee roasters include the issue of smoke generation and excessive aroma. The smoke and excessive aroma are addressed in existing commercial roasters through the use of stack scrubbers and after-burners, and the problem is addressed on home coffee roasters by the recommended outdoor use of the roaster. Another problem of prior art convection or conduction roasters is high energy cost per pound of beans using either gas or electricity.

It is known that microwave ovens are more efficient for cooking, because the microwave energy is delivered directly to the item to be heated. The mechanism through which a microwave ovens heats a food item is through dielectric loss tangent of the absorbing food item, which loss is microwave frequency and food item dependent. Dielectric loss tangent is a measure of the dielectric loss of the medium supporting the traveling microwave. A microwave oven can operate at any frequency for which this loss tangent and dielectric absorption is high enough to cause heating, and the frequency of operation of a microwave oven is also subject to government regulation. Operational microwave oven frequencies are 2450 Mhz and the less common legacy frequency of 915 Mhz. For food items, it is desired that the dielectric loss tangent be uniform over the extent of the item to be heated. For discrete food objects such as coffee beans, this poses a problem, as the beans are both smaller in extent than a quarter wavelength of a typical oven microwave, and the discrete nature of the beans leads to hot-spot heating, with some beans in null areas, and other beans in areas of high standing wave electric fields, which generate much greater heat energy. One solution to this problem is the use of a susceptor layer, which is a local microwave RF absorptive material which is placed near the food product to be cooked. The susceptor absorbs RF, and the localized heating is coupled through a combination of radiation, conduction, and convection onto a nearby food surface. This type of material works well for large uniform cooking areas with distinct boundary areas between the region to be browned and the region to be cooked, such as low moisture content partially cooked pizza crust which is layered with comparatively high water content pizza toppings. Susceptor materials may be constructed from thin film metals or laminates of thin film conductive materials.

One prior art system used a Pyrex® tube containing coffee and closed with a rubber stopper with the enclosed volume connected to a vacuum pump, the assembly rotating in a microwave field, and tested with various levels of applied vacuum. At pressures below 6 mm Hg, coronas of ionized plasma gases appear which furnish a conducting path for electricity and result in an electric discharge, overloading of the equipment, and shutdown with some coffee beans burned in the process. High levels of vacuum could eliminate the plasma discharges, but the required vacuum cannot be drawn because of the water vapor and organic compounds drawn from the coffee under vacuum. Another problem of this system is that once the coffee is dry and temperatures exceed 300° F. (149° C.), there is sufficient localized heating which progressively concentrates on the spots of least resistance. Once carbonaceous areas form on the coffee bean, it is a good electrical conductor and the flow of excessive current in a localized spot causes electrical discharge. This problem is known as the thermal runaway problem, which arises when the power dissipation in a small elemental volume within a work piece exceeds the rate of heat transmission to its surroundings, so that the rate of increase in enthalpy is greater than in its neighbors. The temperature increases at a faster rate than in the surroundings, until decomposition occurs. Thermal runaway invariably degenerates into arcing and carbon formation, which produces profoundly undesired flavors. In the case of coffee and other low moisture foods, like nuts, seeds, dried chicory and guarana, exothermic reactions can take place in various degrees while roasting, and the problem of thermal runaway becomes more acute.

In addition to the above problems, another acute problem for standard microwave ovens is that a quarter wavelength of the 2450 Mhz traveling wave is on the order of one inch, the same length as a small clump of beans, which can cause localized electrical interactions between standing waves generated in the oven and the food items to be roasted.

The prior art and literature show clearly that the use of microwave energy for roasting has not been successfully solved because of non-uniform heating, thermal runaway, which results in carbonization followed by local arcing and plasma, and the problem of variation in level of roasting across many individual food items, as well as non-uniform roasting of any particular food item. For these reasons, the roasting of low-moisture foods (which are defined in the present patent application as foods with a moisture content less than 20%) in a microwave oven without the production of smoke, surface arcing, thermal runaway, and control of roast uniformity have long remained unsolved problems.

OBJECTS OF THE INVENTION

A first object of the invention is an oven for roasting discrete food items such as green coffee beans, raw seeds, dried chicory, raw nuts, and raw guarana, the oven having an enclosure including an operable door with an observation window, the enclosure also coupled to a microwave source, the enclosure also having a rotating support oriented substantially perpendicular to the door, the rotating support having attachment points for insertion of a container with food items to be roasted, the microwave source and rotating support having a known roasting profile which is specific to the food items to be roasted, the roasting profile including a roasting interval during which the rotating support and microwave source are operative with a power level which varies over the duration of the roasting interval, the roasting interval followed by a cool-down interval where the microwave source is turned off while the rotating support remains operative. After the cool-down interval, all power to the microwave is automatically shut off.

A second object of the invention is a process for roasting discrete food items in an enclosure coupled to a microwave radio frequency source, the enclosure having a rotating support and a variable power level, the process including a step of applying microwave energy to the enclosure while rotating the support at an angular velocity which provides uniform roasting, or alternatively, an angular velocity including programmed rest intervals which provides nonuniform roasting of a food item in a food cartridge attached to the rotating support, a step of modifying at least one of the microwave RF source power level or angular velocity during a roasting interval, and a step of turning off the microwave source during a cool-down interval during which time the angular velocity of the rotating support is maintained, followed by a shutdown step where both the rotating support and microwave energy source are disabled.

SUMMARY OF THE INVENTION

In one aspect of the invention, an enclosure is coupled to a source of microwave radio frequency (RF) energy, the enclosure being sealed by a door having a hinge attachment to the enclosure, the door also having an observation window. The enclosure also contains a rotating support with attachment points, the support capable of rotating with an angular velocity which may be controlled and provides viewing of the interior of a food cartridge placed in the rotating attachment. In particular, the angular velocity may be set to a sufficient level such that food items in a container supported by the attachment points of the rotating support are exposed to microwave RF at an energy level and an angular rotation rate which provides uniform roasting or non-uniform roasting of the food items. In particular, the food items may be discrete food items with a low-moisture content, such as coffee beans, nuts or seeds.

The rotating support has attachments which accept food cartridges which are supported and rotated in the center of the oven cavity at a position most beneficial for uniform absorption of electromagnetic waves by the food item in the food cartridge and a susceptor layer in the food cartridge, and in one aspect of the invention, the axis of rotation of the rotating support is perpendicular to the operable door and window such that a transparent window of the food cartridge faces the window of the door for examination of the progression of roasting of the beans. The rotating support is coupled to a user-programmable variable-speed motor, which may be mounted to the back wall of the oven enclosure.

In another aspect of the invention, a high-velocity fan is coupled to one surface of the microwave oven cavity and a second high-velocity fan is mounted on another surface, such as an opposing surface of the microwave oven cavity such that high velocity air is directed to the external surfaces of the food container to provide a controlled temperature of the surface of the container during the roasting interval.

In another aspect of the invention, a high-intensity lamp is mounted in a mirrored surface, such as stainless steel, which also encases a high-velocity fan, such that the lamp can be manually activated using an actuator on the oven.

In another aspect of the invention, a high intensity lamp illuminates a transparent inspection window of a food enclosure containing items to be roasted, and the lamp is controlled to turn on near the end of a programmable roast profile which also controls the microwave RF power and angular rotation of the support, such that the lamp is enabled for operator intervention and examination of the roast level of the food items until the roast profile is complete.

In another aspect of the invention, a control panel allows a user to select the angular velocity of the rotating support, such as by selecting the number of revolutions per minute of the rotating support, and also allows control of a set of roasting profiles that the microwave oven uses to establish roasting parameters and automatically set the roast profile of the food contents. In an aspect of the invention for generating a non-uniform roast of the contents of a food cartridge, the rotational support may periodically stop rotation to increase the non-uniformity of roasting of the contents of the food cartridge to generate a "wide spectrum" roast.

In another aspect of the invention, an external safety switch under user control allows the user to shut down all power to the microwave oven manually.

In another aspect of the invention, the rotating support provides attachments for securing cartridges filled with various low-moisture foods, such as green coffee beans, raw seeds, dried chicory, raw nuts, and raw guarana, the cartridge located in the region of the microwave oven best suited for the absorption of microwave energy by the contents of the cartridge, and where the cartridge is lined with a susceptor layer for converting microwave RF energy into a heated surface adjacent to the food item to be roasted.

In another aspect of the invention, the rotating support provides variable rotation speeds and accommodates optimum roasting of different foods depending upon the food geometry, which causes the discrete food items in the food cartridge to tumble to optimize the uniformity of roasting of the discrete food items in the cartridge, as well as to provide a uniform roast through the radial extent from outside layer to the inner (central) core of any particular food item.

In another aspect of the invention, apertures and fans are provided in the microwave enclosure which provide for the passage of a high velocity of air flow to minimize the adverse effects of exothermic reactions present in low-moisture foods, to produce roasting at lower internal temperatures thereby reducing thermal runaway, to reduce the cool-down period before initiating another roast, and to disperse smoke particulates that would otherwise deposit inside the oven cavity. In a related aspect of the invention, the food cartridge is formed from a paper or organic material which traps or filters smoke particulates formed during the roasting process, thereby reducing the volume of particulates to be transferred.

In another aspect of the invention, the food cartridge and door apertures are aligned such that a high intensity lamp illuminates the contents of the food cartridge such that an observer can determine the state of roast of the food cartridge contents and increase or decrease the remaining roasting time.

In another aspect of the invention, the control panel provides a means for extinguishing any combustion within the oven resulting from inadvertently roasting food items excessively.

In another aspect of the invention, an optical sensor which receives some of the light reflected from the beans through an inspection window of the food cartridge performs an examination of the reflection colorimetry or other reflected light properties of the roasting contents of the food cartridge, which are compared with a desired roast level to determine the end of the roasting interval.

DETAILED DESCRIPTION OF THE INVENTION

The present invention provides an oven for roasting of a collection of individual food objects in aggregate, such as a food cartridge containing coffee beans. To achieve optimum roasting, it is necessary that the beans be uniformly heated internally via microwaves and externally using thermal conduction, thermal convection, and latent heat from steam released in the container, while minimizing the escape into the air of oils and essences that are components of the coffee bean flavor prior to grinding of the roasted beans. If the heating of the beans is not uniform, some of the beans may crack early in the roasting process and others will not, resulting in non-uniform flavor and deleterious effects from the uncooked beans, or will undesirably require time-consuming sorting of the mixed roasted and unroasted beans. Similarly, it is necessary that roasting temperature be properly controlled to assure proper flavor development, which cannot occur if the roasting temperature is either above or below a desired level. In one embodiment of the invention, the rotating support circular motion is periodically stopped and rotation resumed, thereby creating an intentional non-uniform "wide spectrum" roast, whereas in another embodiment of the invention, the rotation is provided throughout the roast cycle to provide a uniform level of roast across the food items.

Figure 1:
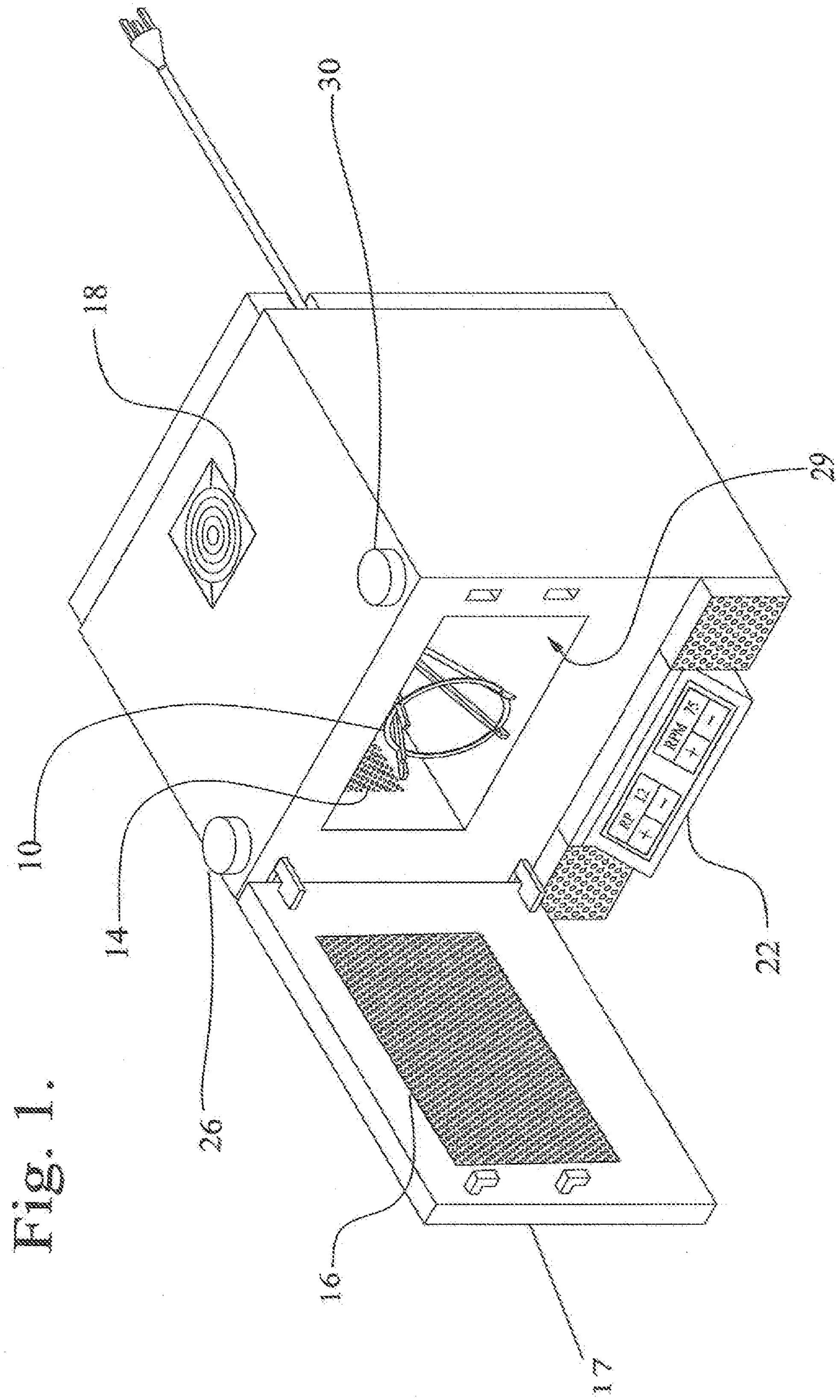
FIG. 1 shows a perspective view of a microwave oven and roasting support.

FIG. 1 shows a perspective view of one embodiment of a roasting oven showing the front, top and right sides. Rotating support 10 holds food cartridges (not shown) and is located in the center of the oven cavity 29. RF blocking ventilation screen 14 is similar to ventilation screen 15 (shown in FIG. 2), disposed on surfaces of the oven cavity 29 and is formed with an array of apertures which pass ventilation air and prevent the passage of microwave energy. Door 17 includes visual screen 16 which is substantially parallel to, and provides viewing into, a front window aperture of a food cartridge 39 (of FIG. 3) placed in rotating support 10. Fan 18 provides high velocity movement of ventilation air through the enclosure, using RF blocking apertures, which convey the ventilation air. Control panel 22 provides touchpads and an indication for the selection or programming of various roast profiles (RP) and also optionally provides for the programming of rotational velocity of rotating support 10, which may be specified in revolutions per minute (RPM). Light switch 26 can be used to manually turn on and off an interior light (not shown) for viewing into the front window of the food cartridge 39 (of FIG. 3) shown as aperture 43 (also shown in FIG. 3). A microwave energy source such as a magnetron (not shown) couples microwave energy in the power range 400 to 1000 W (or a level as required for the volume of the enclosure) into the oven cavity 29, and may include a safety switch to prevent energizing the magnetron when the door 17 is open, or when any other failure occurs which requires turning off the magnetron. Power switch 30 controls electrical power to the microwave oven.

Figure 2:
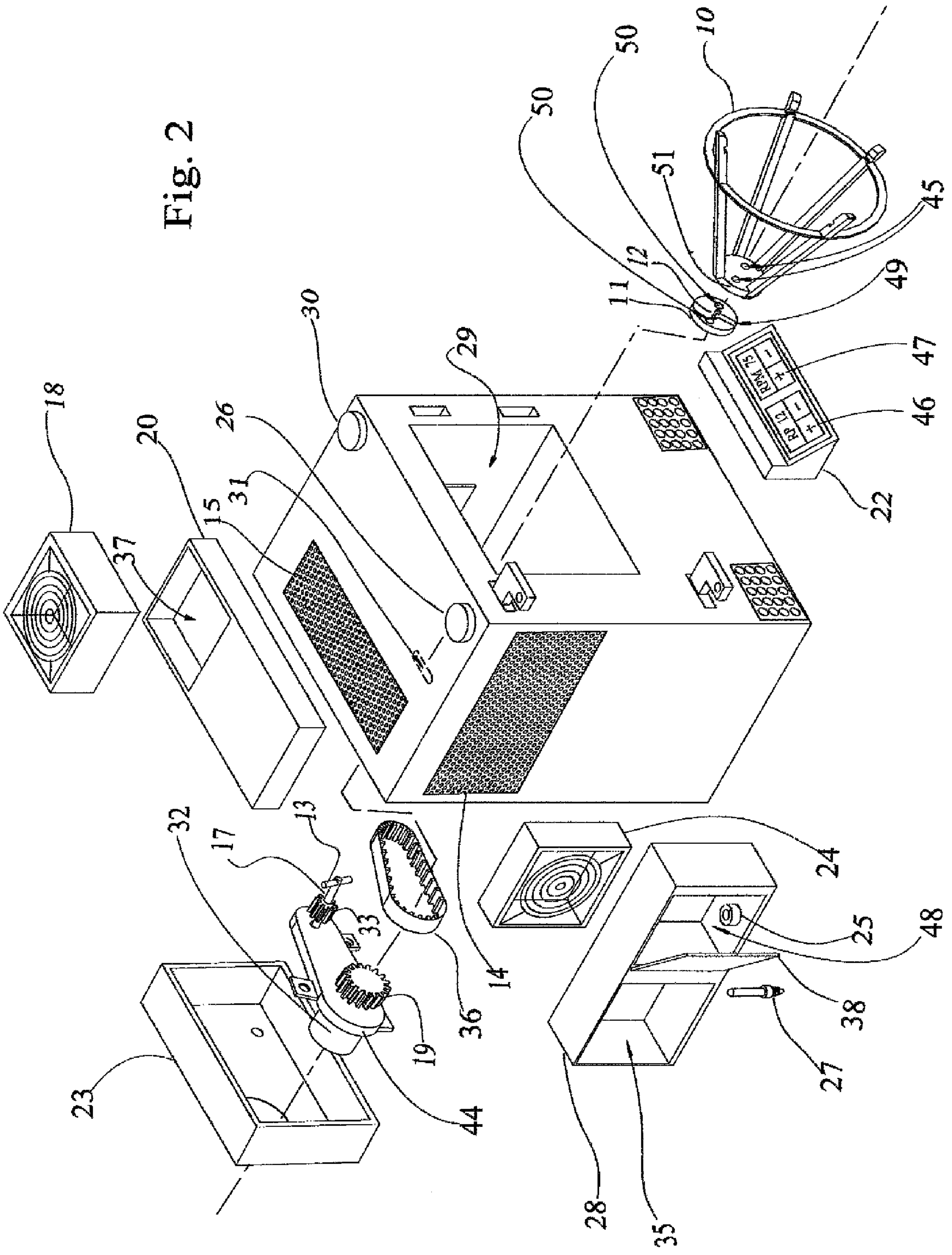
FIG. 2 shows an exploded view of the microwave oven of FIG. 1.

FIG. 2 is an exploded perspective view of the oven of FIG. 1. The exterior surface of the oven may have cowls 20 and 28 which conform to the shape of the top and side of the oven and mechanically support fans 18 and 24, respectively, for coupling high velocity air into the oven cavity 29. Rotating support 10 includes affordances and attachment points 41 (shown in FIG. 3) which accept a food cartridge (also shown in FIG. 3) for rotation through the microwave RF energy. Coupling cylinder 11 provides for the removal of the rotating support 10 from the shaft 17 and attachment 13, which is captured by a matching slot and rotational lock formed in the coupling cylinder 11. Coupling cylinder 11 may be formed from a microwave compatible material with a low loss tangent at the oven operating microwave frequencies, such as Delrin®, that accepts in its hollow cross chamber 12 the rotating support 10 drive shaft end pin 13 which is perpendicular to the end of the rotating support 10 drive shaft 17. In one embodiment of the invention, the drive shaft 17 is electrically coupled to the conductive surface of oven cavity 29 surfaces where the drive shaft 17 penetrates the conductive surface, such as using a rotating electrical coupling or brushes, or conductive bushings, which prevents the loss of microwave energy from the oven cavity 29. Drive shaft 17 is driven by variable speed motor 32 to gear 19 through belt 36 to gear 33, which provides a high rate of rotational velocity to support 11. A cutout 31 in the back panel of the oven cavity 29 may allow end pin 13 to be placed into the oven cavity 29. The two threaded holes 50 in the coupling cylinder 11 allow coupling to the rotating support 10 by means of inserting two microwave-compatible screws (not shown) through the two unthreaded holes 45 in the rotating support base 51 and securing them into the two threaded holes 50 in the coupling cylinder 11. Variable-speed electric motor 32 (406 of FIG. 4 to be described later) is speed controlled by a controller (402 of FIG. 4), which is also coupled to control panel 22. The back motor cowl 23 protects the mechanical drive system, and is mounted using microwave-compatible screws (not shown) to the back of the oven cavity 29. Side screen 14 prevents the escape of microwave radiation from the oven enclosure 29, over which is mounted the fan 24 with microwave-compatible screws (not shown) to the left square section of the side vent screen 14, which is covered by a side cowl 28 attached by screws (not shown) or spot welds (not shown) to the solid margins of the vent 14. Fan 24 transfers air into the oven cavity 29 from the atmosphere by means of the side cowl cutout 35 which transverses the side cowl 28 from front to back. Top cowl 20 has a cutout 37, in which the top fan 18 is contained, which draws air out of the oven cavity 29 and vents to the atmosphere. The top cowl 20 is attached by microwave-compatible screws (not shown) or spot welds (not shown) to the solid margins bordering the rectangular top vent screen 15. A lamp 27 is screwed into the lamp base 25, which is affixed to the side cowl 28 which may also include optional service door 38.

Figure 3:
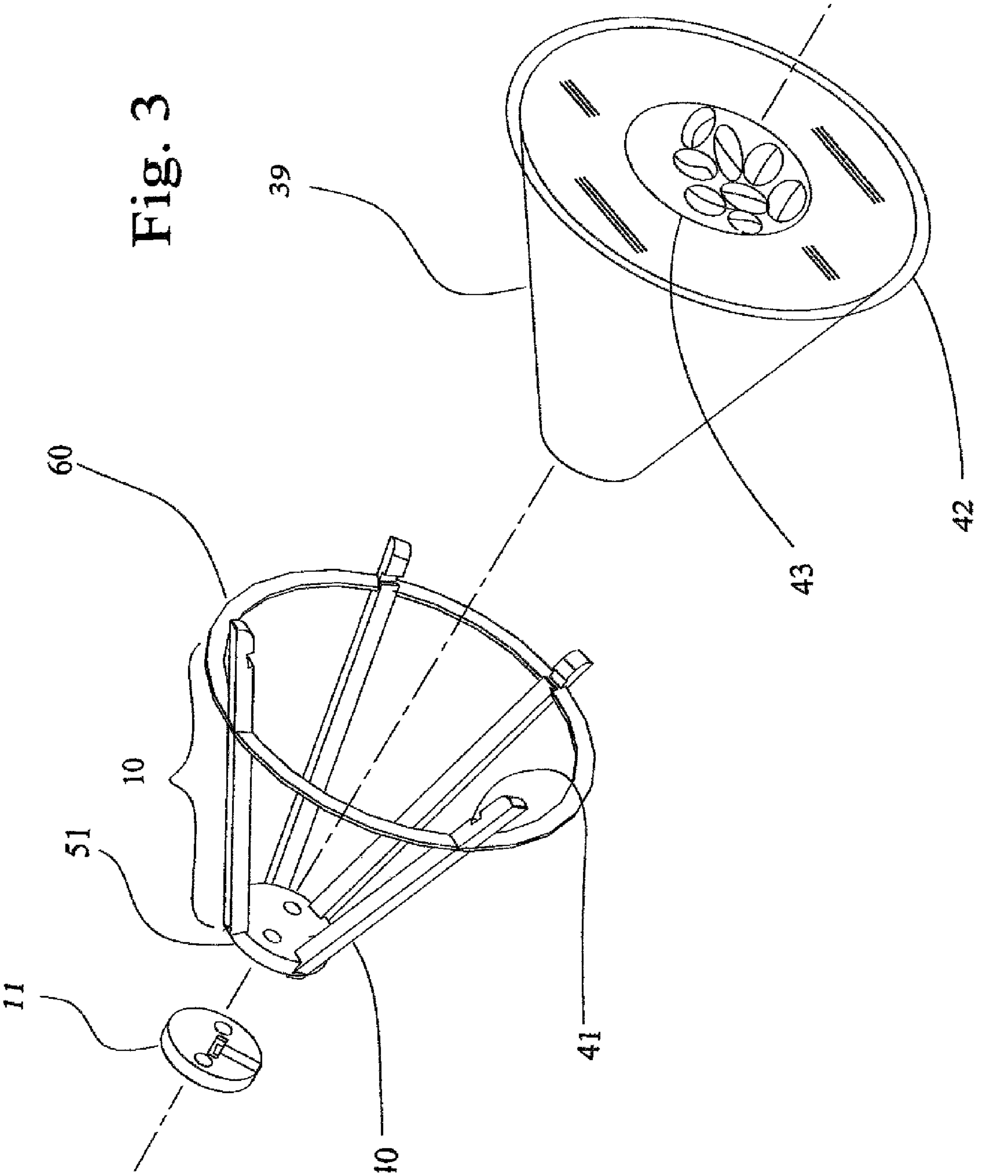
FIG. 3 shows an exploded view of a rotating attachment support and a food enclosure.

FIG. 3 shows a detailed exploded view of the coupling cylinder 11 and the rotating support 10, which includes support base 51, a plurality of the support legs 40 which may have formed therein a support attachment point 41 and supported by optional ring 60, and food cartridge 39, which includes food cartridge lid 42 with food cartridge window 43. In one example of the invention, the food cartridge 39 is filled with green coffee beans and snapped into the attachments of the rotating support 10.

FIGS. 1, 2, and 3 are set forth as an example for understanding the invention, and are not intended to limit the scope of the invention. For example, rotational support 10 driven by motor 44 may be driven through the gear system as shown, directly driven, or using any known method for transferring rotational mechanical motion to the rotating support 10. Additionally, the speed of rotation may be fixed or variable, and may be included as a variable or fixed parameter of a roast profile. The microwave energy source may be a magnetron, or any device which emits radio frequency radiation which can be absorbed by the food cartridge for roasting of the beans. The contents of the food cartridge may be any food item suitable for roasting, and the food cartridge 39 may include one or more layers of susceptor material for providing a heated surface adjacent to the food items to be roasted, specifically to provide a heated surface which is in contact with at least some of the food items tumbling over this surface from the action of the rotating support 10. The susceptor layer may be formed on any surface of the food cartridge which is in direct or indirect contact with the food item (which may also be absorbing microwave energy), or the susceptor layer may be an inner layer of the food cartridge for the purposes of reducing the roasting temperature compared to being in direct contact with the beans to be roasted, or it may be placed to entirely absorb the microwave energy and shield the food item from the microwave energy so that the roasting heat is externally applied by the susceptor layer, or any combination of these. Since the beans are tumbling in the rotating food cartridge which contains the susceptor layer, the susceptor material may be continuously formed over the innermost layer and in momentary contact with the food while the rotating support is rotating, or it may be formed into an intermediate layer, or in combination with either of these configurations, such that the continuous surface of the susceptor may be interrupted with a series of slots or formed into separated regions of susceptor material to create advantageous roasting temperature control or other desired roasting profile characteristics which arise from the manner in which heat is transferred from the rotating cartridge and susceptor layer (or moments when the cartridge is momentarily stopped for "wide spectrum" non-uniform roasts) to the food item to be roasted which is contained by the cartridge.

One of the uses of the invention described herein is the roasting of enough green coffee beans to produce a sufficient amount of roasted coffee which can be ground to brew one 10 cup or 12 cup pot of coffee. Another use of the invention is the roasting of dried chicory as an additive to regular or espresso coffee. Other uses include the fresh roasting of prepackaged food cartridges filled with raw nuts and raw seeds for one snack-size bowl, or the roasting of guarana for a single serving size or pot or for subsequent mixture with ground coffee. In application as a roasting oven, any individual item which is packaged to be placed into the support and rotated in the presence of a heating source such as microwave RF may be done without limitation to those foods. The invention may be practiced in any size through suitable scaling of the various structures to maintain a suitable RF power density for roasting. Typical sizes for food cartridge 39 would provide for two to four ounces of food items, although the roasting oven can operate using any size food cartridge; for example, an incrementally larger oven could provide a food cartridge with a food content weight of 8 to 16 ounces.

Rotating support 10 is placed in the enclosed cavity 29 such that food cartridge 39 is at the central area of the microwave oven cavity 29 and in a region of the reflected RF radiation which is best suited for the even absorption of microwave energy by the food contents of the food cartridge 39.

The geometry of the locations of the door screen 16, lamp 27, vent screen 14, rotating support 10, food cartridge 39, and viewing window 43 are selected such that lamp 27 of FIG. 2 allows the operator to view through the transparent food cartridge window 43 affixed to the food cartridge lid 42. By monitoring the roasting profile by sight, the operator is able to stop the roasting profile at a selected time for optimum roast degree and color. In another embodiment of the invention, a reflected light colorimetry measurement system (sensor 412 of FIG. 4) may be used to control the degree of roast by measuring the color of the roasting beans and stopping the roast process when the bean color reaches a user-settable threshold.

The control panel 22 can be wired to a printed circuit board with an embedded program connected to the variable-speed motor 32, the high-velocity top fan 18, the high-velocity side fan 24, the light button switch 26, and the lamp base 25. The roast profile (RP) touch pad 46 on the face of the control panel 22 allows the operator to key in pre-programmed or user configured roast profiles. The touch pad 47 on the face of the control panel 22 may control parameters such as rotation rate of the rotating support 10 and allow the operator to modify the angular rotation rate. In one embodiment of the invention, recommended roast profiles and the recommended angular rotation rates are printed on the food cartridge lid 42 to insure an optimum roast for the associated food item in the food cartridge 39, or those roast profiles may be remotely read by sensor 412 of FIG. 4 where the roast profile information is provided on the container as an RFID or optical bar code, as is known in the prior art of remote sensing and item scanning. In another embodiment of the invention, pre-programmed roast profiles including angular rotation rate of the rotating support, and power levels, roasting interval and cool-down intervals are programmed into the controller, or can be programmed by the user. Once initiated, the roasting oven will complete the programmed roast profile unless the operator decides to override it by shortening or lengthening, or otherwise modifying it. The roast profile (RP) number commands the power level and duty cycle of the magnetron while the revolutions per minute (RPM) number controls the speed settings of the variable-speed motor 32 that impart the spinning speed to the rotating support 10, loaded with the food cartridge 39.

The hole size or diameter, the number of holes per inch horizontally and vertically, the space between the staggered centers, and the pattern of the side vent screen 14, top vent screen 15 of FIG. 2 and viewing screen 16 are such that the maximum percentage of viewing area and minimal visual occlusion is attained without compromising the microwave-blocking capacity, thereby ensuring that an optimum and controllable volume of air is moved through the oven cavity 29. The greatly increased air flow to the oven cavity 29 reduces the adverse effects and loss of roasting control caused by exothermic reactions in some low-moisture foods, enables roasting at lower internal temperatures thereby curbing runaway roasting, and disperses any smoke particulates escaping through the particulate filtering walls of the food cartridge 39, which would otherwise deposit inside the oven cavity 29, causing the need for more frequent cleaning. The high-velocity side fan 24 is programmed to start automatically prior to the initiation of exothermic reactions taking place within some foods contained inside the food cartridge 39 and before the automatic turning on of the high-lumen lamp 27 toward the end of the roast profile. It aids in preventing heat build up around the high-lumen lamp 27 and inside the oven cavity 29.

The top cowl 20 can be fabricated from metal with a front-to-back top cowl cutout 37, in which the high-velocity top fan 18 is contained and secured to the square right side of the top vent screen 15. Because the top vent screen 15 has the same hole configuration and open area as the side vent screen 14, it allows the high-velocity top fan 18 which is programmed to start when an automatic roast profile is selected to draw the maximum cubic feet per minute of airflow from the oven cavity 29, thereby exhausting the circulated air into the surrounding atmosphere. The high volume of air flow reduces heat build up around the high-lumen lamp 27 when it is turned on and reduces heat build up in the oven cavity 29, thereby minimizing cool-down periods between consecutive roast profiles, prolonging the time interval between cleanups, and mitigating the adverse effects of exothermic reactions. Both the top fan 18 and the side fan 24 are programmed to stop at the end of the cool-down cycle for the roasted food. The top cowl 20 is attached by screws (not shown) or spot welds (not shown) to the solid margins bordering the rectangular top vent screen 15.

Figures 4, 5:
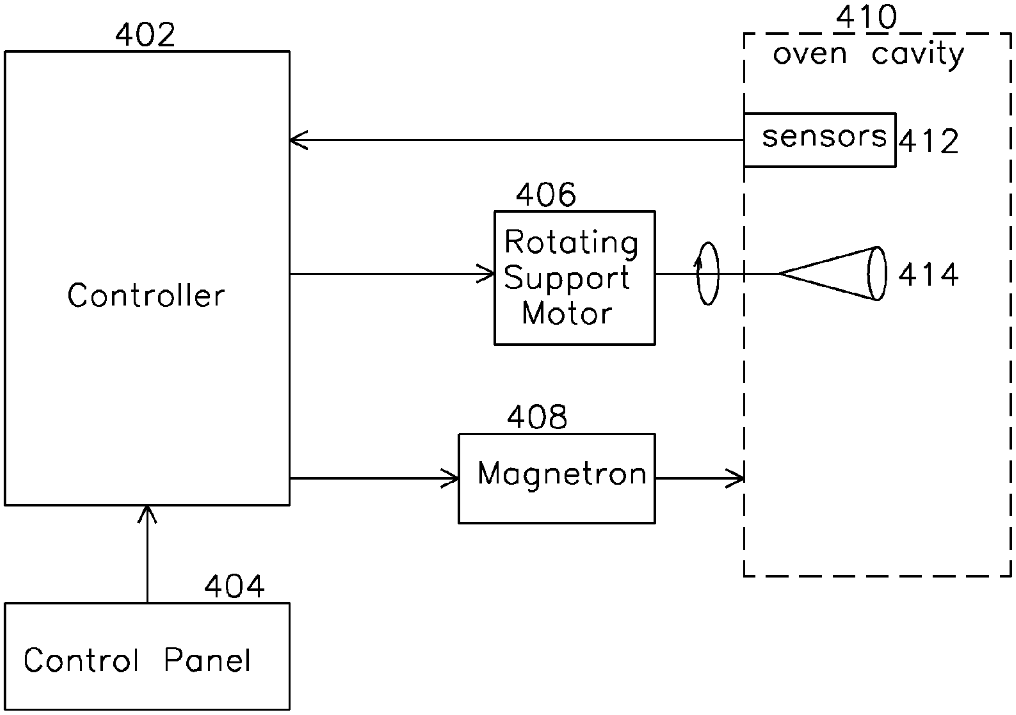
FIG. 4 shows a block diagram of the electrical elements of the invention.
FIG. 5 shows a roast profile database.

FIG. 4 shows a simplified electrical block diagram of the roasting oven of FIGS. 1, 2, and 3. Controller 402 receives input commands from control panel 404, which commands may include the selection of a particular roast profile which has associated parameters of a fixed or variable RF power level which is furnished to magnetron 408 as a pulsed AC according to a duty cycle, or a variable voltage, or any known method for controlling the output power of a magnetron. The microwave RF energy from RF source 408 is applied to cavity 410. The controller 402 also determines a food cartridge support rotational speed, which is converted into a voltage and applied to motor 406 which is coupled to rotating support 414. The controller may also read from optional sensors 412 of a variety of types. In one embodiment, sensors 412 may read a reflected optical colorimetry value from a viewing window of the food cartridge (not shown), or they may read a roast profile from the food cartridge which is placed in rotating support 414, and the roast profile may be communicated to sensors 412 using RFID, an optical bar code, or any means for communicating roasting information from a food cartridge to the controller 402. Other functions which are not shown may be part of the controller, or provided with external switches, such as an internal light source, emergency shutoff, fan controls, etc.

FIG. 5 shows an example roast profile table, which may include any profile types and parameters, not limited to: a fixed or stepped power level applied over a roasting interval, optical calorimetric information (not shown) for use by sensors 412 in establishing a threshold for an end point of a roast cycle, or specific roast profile information provided as metadata and for use by controller 402. Example 502 shows an Italian roast profile for coffee, which roast profile may be assigned a number and marked on the packaging of the food cartridge, or read by sensors 412 of FIG. 4, where an example roast profile includes (but is not limited to) a power level, rotation rate, duration for a roast interval, and a time and rotation rate for a cool-down interval. Fan speeds may also be set using profile information, as required. Similarly, a food cartridge for sunflower seeds in the example 504 may be marked with a roast profile number, or a profile may be read by sensors 412 based on a uniform roast profile, shown as entry 504, which values could be associated with a roast profile known to the controller 402, or each parameter could be placed in a sensor such as an RFID, bar code, or other indicator read by sensor 412. In additional alternative embodiments of the invention, the sensor may include a particulate or smoke detector for examining the particulate load in the oven, an infrared detector, or any other detector which may be read by the controller for indicating either roasting completion or shutdown.

In one embodiment of the invention, the oven cavity 29 is fabricated from stainless steel with a mirrored surface or a highly burnished finish, the oven cavity 29 reflective enough for the operator to clearly view through the aperture 43 of food cartridge 39 the progression of the color of the roasting food illuminated by lamp 27. A light switch 26 controls the lamp 27 so as to allow the operator the ability to monitor the roast profile and override it if desired.

The power switch 30 controls the application of power to the microwave oven. This provides a safety measure when an operator inadvertently runs a food cartridge 39 through two automatic roast profiles consecutively or overrides the end of a roast profile manually and lets the roasting cycle run excessively. By shutting down the microwave oven and fans, the operator ensures that the lack of oxygen will extinguish any smoldering fire in a short while without damage to the structures or internal elements of the microwave oven.

We claim:

1. An oven for roasting coffee, the oven comprising:

an oven cavity having a microwave RF generator generating microwave energy into said oven cavity, said oven cavity formed by a bottom surface, a top surface, a left side wall, a right side wall, a back wall, and enclosed by a front hinged door opposite said back wall, said front hinged door with a viewing port having a plurality of apertures sufficient to enclose said microwave energy, said oven cavity enclosing a volume when said hinged door is closed;

a rotating support supported by a drive mechanism attached to an inner region of said back wall, said rotating support having attachment points for a food cartridge, said rotating support having an axis of rotation perpendicular to said viewing port;

said food cartridge having an observation window facing said viewing port, said food cartridge supported by said attachment points;

whereby said food cartridge contains a food item, said microwave energy roasts the contents of said food cartridge, and said viewing port provides an indication of the level of roasting of said food item, said food cartridge thereby rotating substantially in the center of said enclosed volume without contact to said bottom surface, said top surface, said left side wall, or said right side wall.

2. The oven of claim 1 where one or more fans provide airflow through a vent screen of said oven cavity, and airflow of at least one said fan is directed to said support sufficient to provide cooling of said container.

3. The oven of claim 1 where said support rotates according to a programmable roast pattern which includes a magnetron power and angular rotation rate during a roast interval, and an angular rotation rate during a cool-down interval.

4. The oven of claim 1 where said support rotates at an angular velocity sufficient to provide uniformity of roasting of the contents of said food cartridge.

5. The oven of claim 1 where said food cartridge includes a susceptor layer suitable for roasting a food item with a moisture content less than 20%.

6. The oven of claim 1 where said food cartridge encloses at least one of: green coffee beans, raw seeds, dried chicory, raw nuts, and raw guarana.

7. The oven of claim 1 where said food cartridge includes an illumination source which provides direct or indirect lighting of the front of said food cartridge, and said food cartridge includes a transparent aperture for viewing of said food items.

8. The oven of claim 1 where said food cartridge includes an illumination source and an optical sensor which determines at least a microwave source power level and a rotational speed based on said optical sensor.

9. The oven of claim 1 where said food cartridge includes a susceptor material for converting incoming microwave energy into thermal energy, said thermal energy is coupled to the contents of said food cartridge.

10. The oven of claim 1 where said food cartridge comprises a porous layer, a susceptor material lining at least part of said porous layer, and said viewing port faces said viewing window.

11. An oven for roasting coffee beans, the oven having:

a substantially rectangular enclosure which is closed on five sides and has a sixth side with an operable door having a viewing aperture;

a power controllable magnetron RF microwave source coupled into said enclosure;

a plurality of RF reflective vent apertures for entry and egress of cooling air into said enclosure, at least one of said vent apertures having air directed from a cooling fan;

a rotating support holding a food cartridge containing food items, said food cartridge having a viewing aperture which is continuously visible from said door viewing aperture when said rotating support is rotating;

said rotating support driven by a shaft which is perpendicular to said viewing aperture such that said food cartridge does not contact said five sides or said sixth side;

an illumination source which provides illumination into said food cartridge viewing aperture;

a controller for selecting a roasting profile which includes a roasting interval and a cool-down interval, where during said roasting interval, said controller enables said magnetron and the rotation of said rotating support, and during said cool-down interval, said controller enables only said rotating support;

whereby said food cartridge is supported in said enclosed volume and is not in contact with said five sides or said sixth side.

12. The oven of claim 11 where said rotating support has a rotation rate from 0 to 100 RPM.

13. The oven of claim 11 where said food items are at least one of: a food item with a moisture content less than 20%, unroasted coffee beans, unroasted nuts, dried chicory, raw seeds, or raw guarana.

14. The oven of claim 11 where said magnetron generates a power level in the range from 400 W to 1000 W.

15. The oven of claim 11 where said food cartridge includes a microwave-energy absorbing layer in a partial region of said food cartridge to provide a heated surface for the food items to tumble over.

* * * * *